United States Patent [19]
Danko

[11] 3,886,250
[45] May 27, 1975

[54] METHOD AND APPARATUS FOR MAKING AN EXTRUDED ARTICLE OF RIGID PLASTIC WITH A GRAINED SURFACE

[75] Inventor: Edward M. Danko, Detroit, Mich.

[73] Assignee: Color Custom Compounding, Inc., Detroit, Mich.

[22] Filed: Dec. 7, 1972

[21] Appl. No.: 312,982

Related U.S. Application Data

[63] Continuation of Ser. No. 119,167, Feb. 26, 1971, abandoned, which is a continuation-in-part of Ser. No. 859,010, Sept. 18, 1969, abandoned.

[52] U.S. Cl.......... 264/177 R; 264/210 R; 264/237; 264/284
[51] Int. Cl........................ B29d 7/04; B29d 17/14
[58] Field of Search........ 264/210 R, 284, 237, 280, 264/178 R, 177, 167; 425/72, 328, 377

[56] References Cited
UNITED STATES PATENTS 2,958,909  11/1960  Bradley et al.................. 264/177 R
3,038,205  6/1962   Plummer......................... 264/210 R
3,540,959  11/1970  Conner............................... 264/284

*Primary Examiner*—Jeffery R. Thurlow
*Attorney, Agent, or Firm*—Farley, Forster and Farley

[57] ABSTRACT

An article made of a rigid plastic such as ABS and having a grained surface, is made by extruding the plastic to a preliminary shape in which the surface to be grained is planar, cooling the surface of the extrusion and passing it between graining and pressure rolls arranged and driven so as to prevent a loss in shape of the extrusion prior to and during the performance of the graining operation. Preferably, the plastic is extruded oversize, and the graining and pressure rolls perform their shaping function by a drawing action which reduces the size of the extrusion. The grained extrusion is then passed through cooling and forming means which establish the final configuration and size of the article.

5 Claims, 10 Drawing Figures

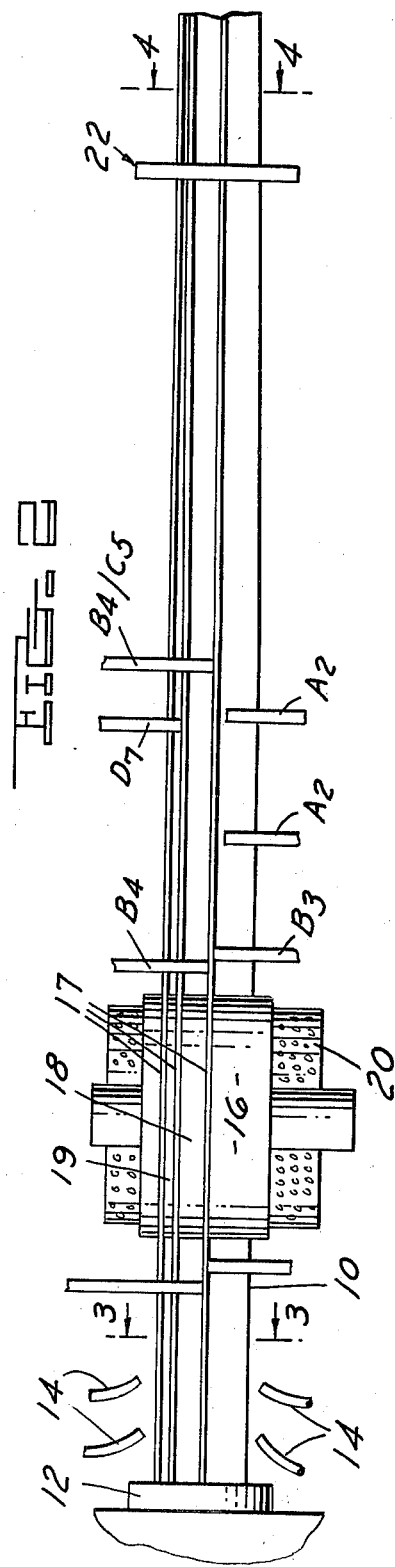
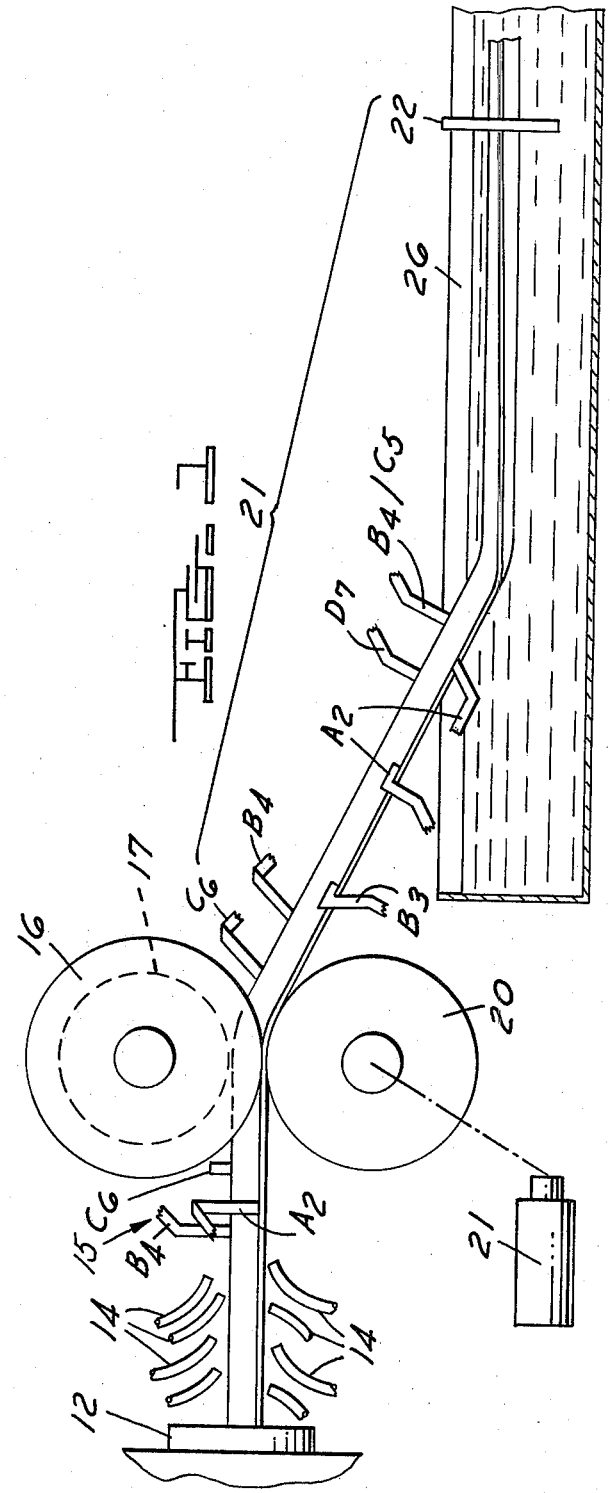

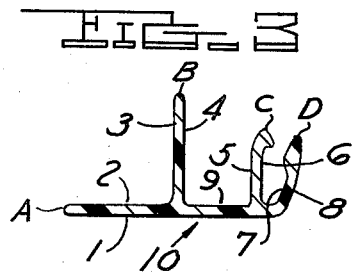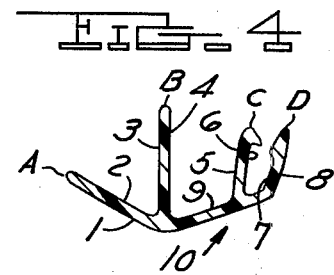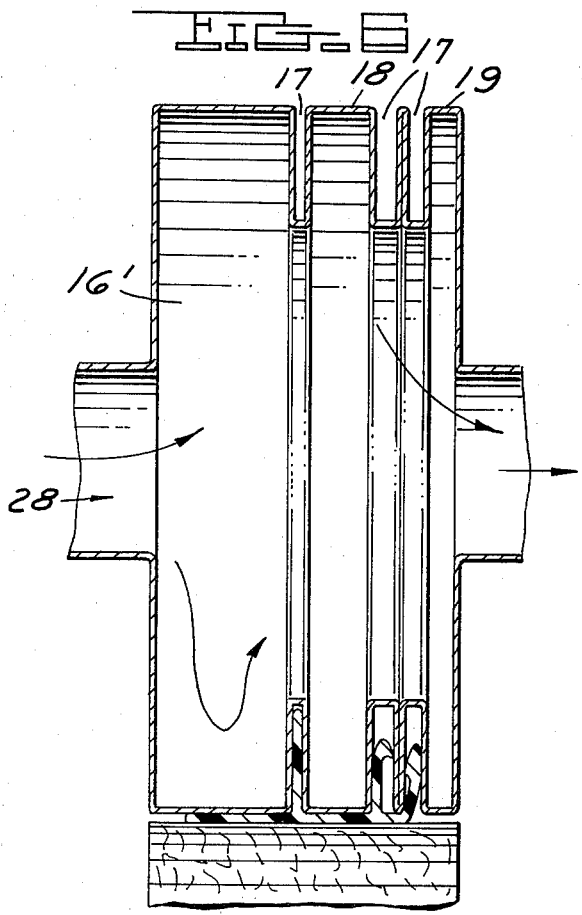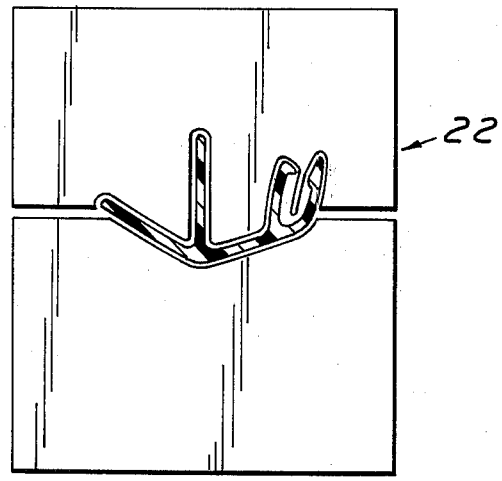

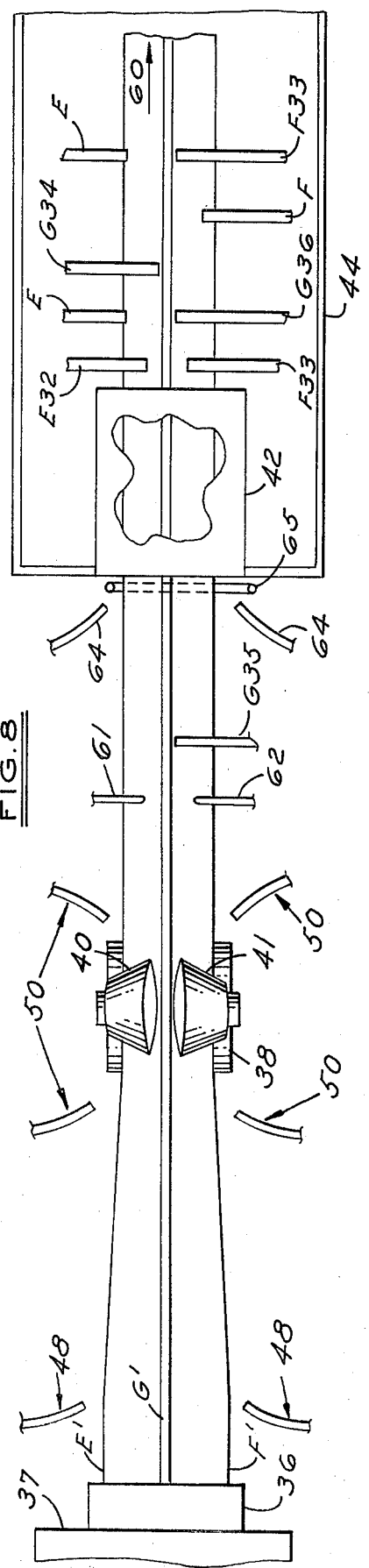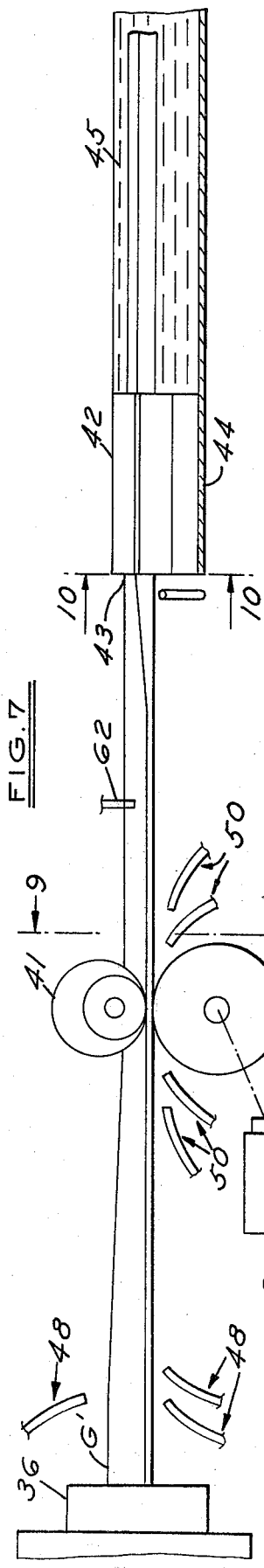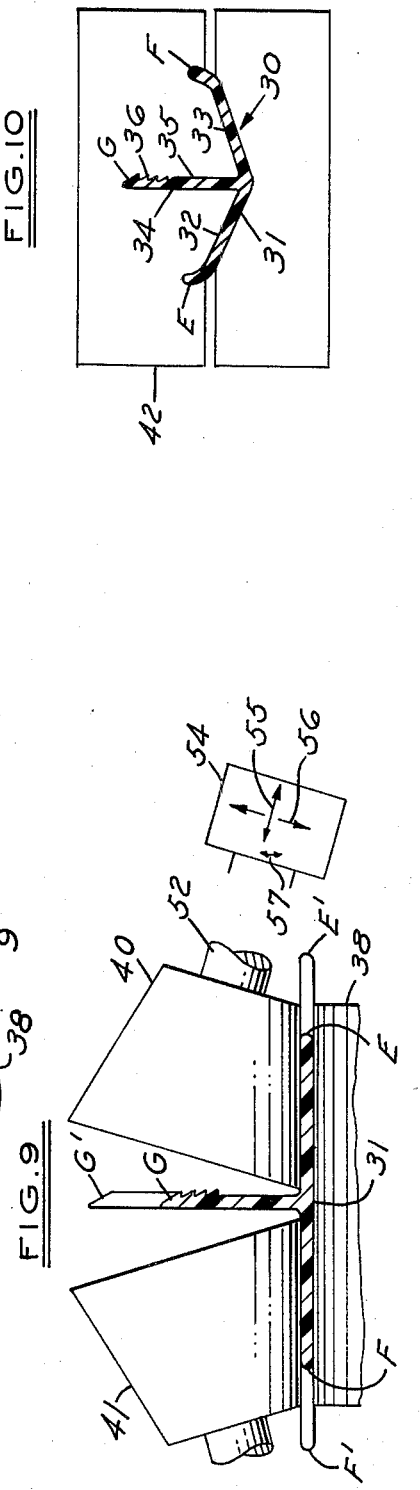

METHOD AND APPARATUS FOR MAKING AN EXTRUDED ARTICLE OF RIGID PLASTIC WITH A GRAINED SURFACE

RELATED APPLICATION

This application is a continuation of my copending application Ser. No. 119,167, filed Feb. 26, 1971, which is a continuation-in-part of my copending application, Ser. No. 859,010, filed Sept. 18, 1969, both now abandoned.

SUMMARY OF THE INVENTION

Methods and apparatus for extruding and graining articles made of the soft, non-rigid plastics are known, examples being found in U.S. Pat. Nos. 2,671,041 and 2,958,909 relating to the manufacture of extruded plastic trim for automobile body interiors. A rigid plastic material, however, cannot be processed in the same manner as a soft plastic. An extrusion of a rigid plastic is initially relatively hotter than a soft plastic extrusion, and more importantly, is dimensionally unstabile, tacky, and will stick to any object the extrusion contacts. Because of these characteristics, rigid plastic extrusions have conventionally been cooled as rapidly as possible to a setting temperature at which these undesirable characteristics disappear, but at which forming operations on the extrusion cannot be carried out. Articles having a grained finish on at least a portion of the surface thereof and composed of a rigid plastic material, have heretofore been made by molding.

The present invention provides an extruded article having the characteristics of a grained finish and a rigid plastic composition. A rigid plastic such as ABS (acrylonitrile butadiene styrene) or polypropylene is extruded from a die with a surface to be grained flat or planar, and the surface of the material is rapidly cooled to a non-sticky or graining temperature. The extrusion is passed in a direct line from the extrusion die between a graining roller which contacts the surface to be grained, and a positioning roller or rollers which maintain the extrusion in contact with the graining roller. One of the graining and positioning rollers, preferably the former, is driven at a speed such that the rollers exert a pulling action on the extrusion and not only perform the graining operation but also act to overcome the dimensional instability of the hot rigid plastic material between the extrusion die and the rollers. Increased production rates and improved control over the hot extrusion can be obtained by making the sectional dimensions of the extrusion die appreciably greater than the final sectional dimensions of the article, and by driving the graining and positioning rollers at a rate which causes the extrusion to be drawn down to approximately final dimensions.

When the extrusion leaves the graining and positioning rollers it is still quite hot, but the surface has acquired an initial set. The extrusion is then directly passed through cooling and forming means where the final sectional configuration and size is established, the forming means preferably including a plate having an aperture through which the extrusion passes, the aperture conforming to the final sectional shape of the article. This forming plate is positioned in a tank of coolant.

Other features and advantages of the invention will appear from the description to follow of the methods and apparatus illustrated in the accompanying drawings for the manufacture of articles of rigid plastic of representative sectional shapes.

DESCRIPTION OF THE DRAWINGS

FIG. 1 is a schematic elevation showing a trim strip article and the apparatus for graining and shaping;

FIG. 2 is a plan view of the apparatus of FIG. 1;

FIG. 3 is a cross-section of the trim strip taken as indicated by the line 3—3 of FIG. 2;

FIG. 4 is a cross-section of the trim strip in final form after graining and shaping, taken as indicated by the line 4—4 of FIG. 2;

FIG. 5 shows the configuration of a forming plate, giving the final shape to the trim strip;

FIG. 6 is a cross section of an optional forced convection cooled hollow positioning roller;

FIG. 7 is a schematic elevation illustrating a modified form of apparatus;

FIG. 8 is a plan view of the apparatus shown in FIG. 7;

FIG. 9 is an enlarged sectional elevation taken as indicated by the line 9—9 of FIG. 7; and, FIG. 10 is an enlarged sectional elevation taken as indicated by the line 10—10 of FIG. 7.

DESCRIPTION OF THE PREFERRED EMBODIMENTS

The method and apparatus illustrated in FIGS. 1–6 are for the manufacture of a strip of automotive body trim 10 from a rigid plastic, polypropylene. This trim strip 10 is to have the cross-sectional shape shown in FIG. 4 and is to have a simulated leather grained finish on the curved surface 1, or at least on some portion of this surface. Other portions of the trim strip include a flange A having a surface 2 opposing a portion of the surface 1, a flange B with opposite surfaces 3 and 4, a flange C with opposite surfaces 5 and 6, and an adjacent flange D with opposite surfaces 7 and 8. A surface 9 between the flanges B and C opposes a portion of the surface 1.

A die 12 is constructed for a conventional extrusion machine (not shown). This die is designed to form the material into the preliminary cross-sectional shape illustrated in FIG. 3 in which the surface 1 is planar and the flanges B, C and D are substantially perpendicular thereto.

In the apparatus of FIGS. 1 and 2, the trim strip 10 is extruded from the die 12 in a conventional manner at an extrusion temperature in the order of 400° F. At this temperature, the plastic is dimensionally unstabile and has a tendency to stick to metal surfaces. Therefore, cooling means including air pipes 14 provide an air stream to cool the surface of the strip to a graining temperature slightly below 300° F, a graining temperature in general being one at which the strip is sufficiently hot for graining and further shaping without sticking to metal surfaces. Guide means 15, consisting of three guides, A2, B4 and C6, contact the surfaces of the strip 10 correspondingly numbered in FIG. 3 to insure proper alignment of the surfaces of the strip with a positioning roller 16 and a graining roller 20 between which the strip is passed.

Roller 16 is provided with slots 17 that receive the flanges B, C and D of the strip 10 and with cylindrical surfaces 18 and 19 that engage the surfaces 2 and 9 thereof. The graining roller 20 impresses the graining pattern into the flat surface 1 of the strip. A variable speed drive unit 21 powers the graining roller 20, although in applying the apparatus to the production of other extruded shapes it may be desirable to power the positioning roller 16 or to power both of the rollers 16 and 20. The speed of the drive unit is set so that the rollers 20 and 16 have a pulling action on the strip which maintains the shape of the tacky material, and prevents sag from appearing between the die 12 and the rollers.

Downstream from the graining roller 20 the strip 10 passes through forming means 21, here shown as a combination of guides C6, B4, B3, A2, D7, B4, C5 and a forming plate 22. Again, these guides contact the correspondingly numbered surfaces of the strip shown in FIG. 3 and FIG. 4. The strip 10 is still sufficiently hot to be deformed by the guides from the shape in FIG. 3 to the final shape in FIG. 4 defined by the forming plate 22, as shown in FIG. 5. The strip 10 cools as it passes through the guides from C6 to B4, C5 and becomes stiffer and stiffer until it reaches its final rigidity at about 150° F. The forming plate 22 may be located in a cooling water bath, shown schematically by the line 26, which provides for the final cooling and setting of the strip.

It is apparent that the forming means and temperatures noted above must be altered to suit the shape of the strip being grained and the temperature properties of the particular plastic used. The positioning roller 16 will also depend in configuration upon the configuration of the extruded strip. In some instances it may be desirable to employ a configuration of positioning rollers, or a combination of positioning rollers, together with a speed of rotation of the graining and positioning rollers such that these rollers not only stabilize the dimensions of the extrusion, but actually draw the extrusion down from an oversize section established at the die of the extruding machine.

This is illustrated by the apparatus of FIGS. 7–10 for the manufacture of another extruded article 30, composed of a rigid plastic material, and having a grained finish applied to a portion of the surface thereof. The final sectional shape of this article, shown in FIG. 10, consists of side portions E and F and a central flange portion G; the side portions E and F including a grained surface 31 opposed by surfaces 32 and 33, the flange portion G having a surface 34 and an opposite surface 35 with serrations 36.

The apparatus of FIGS. 7 and 8 includes a die 36 at the extruding machine 37, a graining roller 38 driven by a variable speed drive unit 39, a pair of pressure rollers 40 and 41, and a forming block 42 mounted at the entrance 43 of a tank 44 filled with a coolant 45 such as water.

As best illustrated by FIG. 9, the extrusion die 36 has an extruding aperture such as to define an intial cross-sectional configuration, shown by the side portions E' and F' and central flange portion G', which is dimensionally larger than the cross-sectional size of the finished article, and with the surface portion 31 to be grained in a planar condition. Preferably, the overall sectional dimensions of the aperture in the die 36 are on the order of 50% greater than the corresponding dimensions of the finished article; however, the thickness dimensions of the initial extrusion and finished article are substantially the same.

Immediately after the plastic material comes from the die 36, the surface temperature of the extrusion is reduced by cooling means consisting of a group of air discharging nozzles 48 adjacent the die 36 and a second group of air discharging nozzles 50 adjacent the graining roller 38 and positioning rollers 40 and 41. This second group of nozzles 50 also serves to prevent the graining and positioning rollers from overheating, and the cooling action of the nozzles and rollers imparts a set to the grained finish.

Each of the positioning rollers 40 and 41 has the shape of a truncated cone, as best shown in FIG. 9, and is mounted on a shaft 52 carried by schematically illustrated mounting means 54 which permit the roller to be adjusted in directions 55 parallel to the axis of the shaft 52, in directions 56 transverse to the axis of the shaft 52, and permit the angular position of the axis of the shaft 52 to be adjusted in directions 57. In other words, the positioning rollers 40 and 41 can each be adjusted relative to each other and to the surface of the graining roller 38 so as to have a uniform action over as great a portion of the surface of the article as is possible without interference with the central web portion G thereof.

When the apparatus is operated, the speed of the drive unit 39 is adjusted so as to drive the graining roller 38 at a rate such that the graining and positioning rollers draw the extruded article from the die 36 and reduce the sectional size thereof to approximately finished dimensions. In the example illustrated, the graining and positioning rollers reduce the sectional dimensions of the extrusion by about one-third as previously mentioned. The action of the graining and positioning rollers enables the rate of production of the extruded article to be increased; compensates for the dimensional instability of the hot rigid plastic coming from the die 36; and, prevents the extruded material from sagging between the die 36 and the graining and positioning rollers.

Movement of the extruded material following the graining and positioning rollers results from the action of a conventional winding reel, or puller (not shown) which exerts a pulling action on the extruded article as indicated by the arrow 60 in FIG. 8, drawing the extruded article through the forming plate 42. Prior to entering the forming plate, the surfaces 32 and 33 of the article are softened for final forming by heating means such as heat guns or torches 61 and 62 mounted so as not to apply heat directly to the grained surface 31. Guide means G-35 is provided following the heating devices 61 and 62 to contact the correspondingly identified surface of the extrusion and prevent sagging of the central flange portion.

At the entrance to the forming plate 42, air discharging nozzles 64 and a water spray device 65 are provided to begin the final cooling of the extrusion, the water spray device 65 being arranged to apply water to the grained surface 31 to set the grain and to act as a lubricant between the extruded article and the forming plate 42. The forming plate 42 defines the finished dimensions and configuration of the extruded article, and in the example shown, converts the grained surface 31 of the article from a planar to a curved configuration. Guide means shown in FIG. 8 are provided following the forming plate 32 to hold the shape of the article as it reaches a final setting temperature. These guide means contact the correspondingly identified surfaces of the article shown in FIG. 10.

Imparting the final shape to the article results from the action of the forming means and from the cooling of the extruded material to a setting temperature. An article of relatively thin cross-section will obviously cool to a setting temperature faster than one of thicker cross-section and with such a relatively thin section it may be desirable not to employ the water bath but to use air cooling alone. Also, the more rigid the plastic material, the higher the setting temperature, and hence the final shape must be imparted more quickly. Those skilled in the art of extruding rigid plastics will readily appreciate how these variables in shape and material can be compensated for by the flexibility of the present apparatus. Any forming means can be selected to suit the shape of the article, such as: (a) a forming plate or series of forming plates (b) a guide or series thereof; (c) a combination of (a) and (b); or, (d) a forming and positioning roller or rollers in combination with (a), (b) or (c). Likewise, the cooling can be controlled by the use or non-use of a water bath and by the spacing of the forming means along the path of travel of the material.

Where the extruded article is of a relatively thick cross-section, it may be necessary to cool the positioning roller or graining roller, by a water bath or internal forced convection cooling, as shown in FIG. 6, to prevent sticking and impart an initial set to the grain. FIG. 6 illustrates an optional hollow positioning roller 16' with a fluid coolant 28 passing through. Alternatively, where the cross-section of the extruded article is relatively thin it may not be necessary to provide the air stream cooling or the special cooling for the positioning roller and graining roller.

I claim:

1. The method of making from a rigid plastic material an article having an embossed finish applied to at least a portion of the surface thereof, comprising the steps of:

extruding the rigid plastic material to a preliminary shape through a die having an extruding aperture which is dimensionally larger than the finished sectional size of the article and which forms the portion of the article to which the embossed finish is to be applied as a planar surface;

cooling the surface of the extruded material to a graining temperature at which the material is formable without permanent sticking to another surface;

passing the extruded material between embossing and positioning roller means, the embossing roller means engaging the planar surface portion of the extrusion, and compensating for dimensional instability of the extruded material by driving at least one of said roller means at a speed such as to drawdown the sectional size of the extruded material between the die and the roller means to approximately finished dimensions at the discharge side of the roller means;

then forming the article to a finished shape, in which the embossed surface portion is non-planar and the embossed finish applied thereto is retained, by directly passing the embossed and sized material to forming means which bring the material to the finished shape while heat is retained in the material from the extruding step, said forming step including passing the material through a forming plate; and, cooling the material to setting temperature.

2. The method as set forth in claim 1 wherein a simulated leather grain is embossed.

3. The method set forth in claim 1 wherein the step of cooling the material to setting temperature is initiated by applying a coolant to the material prior to the passage thereof through said forming plate.

4. The method set forth in claim 1 wherein the step of reducing the surface temperature of the extruded material is at least in part performed simultaneously with the step of passing the extruded material between said roller means.

5. The method set forth in claim 4 further comprising cooling at least one of said roller means.

* * * * *